US006672750B1

(12) United States Patent
Kao

(10) Patent No.: US 6,672,750 B1
(45) Date of Patent: Jan. 6, 2004

(54) MULTIPLE PATTERN ILLUMINATION SYSTEM

(75) Inventor: Cheung Chong Kao, Chai Wan (HK)

(73) Assignee: Boto (Licenses) Limited, Douglas (GB)

( * ) Notice: Subject to any disclaimer, the term of this patent is extended or adjusted under 35 U.S.C. 154(b) by 0 days.

(21) Appl. No.: 10/075,003

(22) Filed: Feb. 13, 2002

(51) Int. Cl.⁷ .................................................. F21V 7/04
(52) U.S. Cl. ........................ 362/567; 362/583; 362/554; 362/122; 362/277; 335/901; 335/147
(58) Field of Search ................................. 362/551, 554, 362/583, 558, 563, 564, 567, 568, 122, 123, 232, 277, 280, 281, 284, 323, 324, 559; 40/427, 547, 444; 385/115, 116, 147, 901

(56) References Cited

U.S. PATENT DOCUMENTS

| | | | |
|---|---|---|---|
| 4,279,089 A | * | 7/1981 | Murakami ..................... 40/547 |
| 4,591,955 A | * | 5/1986 | Kallay .......................... 362/101 |
| 4,738,510 A | * | 4/1988 | Sansom ....................... 385/116 |
| 6,139,161 A | * | 10/2000 | Honda et al. .................. 362/17 |

FOREIGN PATENT DOCUMENTS

JP  401233478 A  *  9/1989

* cited by examiner

Primary Examiner—Stephen Husar
Assistant Examiner—Hargobind S. Sawhney
(74) Attorney, Agent, or Firm—Camille L. Urban; G. Brian Pingel

(57) ABSTRACT

The present invention is an apparatus for lighting a decorative tree which includes optical fibers with their first ends distributed in branches and ornaments of the tree, a color sleeve loop, a roller and track system attached to a motor which rotates the color sleeve loop through the system, and a light source. As the color sleeve is moved by the motor between the light source and the optical fibers, the color of the light provided to the optical fibers changes thereby changing the color displayed in the tree. The preferred embodiment uses a color sleeve with two different tracks of color and a divider which divides the optical fibers into two sets. Then one set of optical fibers is exposed to one color track and the other set exposed to the other track; light provided to one part of the tree will change colors differently than light provided to another part of the tree.

10 Claims, 7 Drawing Sheets

MULTIPLE PATTERN ILLUMINATION SYSTEM

BACKGROUND OF THE INVENTION

1. Field of the Invention

The present invention relates in general to an apparatus for providing light through optical fibers and, more specifically, to an apparatus which utilizes multiple bundles of fiber to provide patterns of light and colored light.

2. Description of the Prior Art

It is known in the art to use optical fibers and a light source to convey light to various locations. It is also known in the art to subject the ends of a bundle of these fibers to light filtered through a turning color wheel such that the light which is conveyed alternates in color. Similarly, if it is desired that different portions of the lighted object exhibit different colors simultaneously, it is known in the art to employ a plurality of bundles, each provided with its own light source. Each bundles' fibers are then distributed over the object to be lighted such that light is delivered accordingly. Each light source can be provided its own color wheel or may share a film strip with various colors and which is attached to a turning wheel between each light source and its respective bundle of optical fibers.

The present invention differs from the above referenced inventions and others similar thereto in that these prior devices use turning disks to provide the pattern, which dictates the light results. In contrast, the present invention uses a roller system to create a track over which a color sleeve loop is moved. The track is located between a light source and a bundle of optical fibers. In addition, where a variety of simultaneous colors or blinking effects is desired, the above referenced inventions require multiple light sources whereas the present invention uses a single source of light to achieve this effect. In the present invention, the color sleeve loop, which travels in between the light source and the ends of the fiber optic bundles can be provided with multiple tracks such that one track may be of varying colors while the adjacent track may include patterns of intermittent light for blinking effects, etc. The light filtered through each track reaches only one bundle of optical fibers through the use of dividers.

Objectives of the present invention include reducing the cost, maintenance, and heat problems associated with multiple light sources while also providing a device which allows a variety of light patterns to be employed simultaneously.

SUMMARY OF THE INVENTION

The present invention provides an apparatus to light an object by utilizing a color sleeve loop on a roller and track system to provide light to the bundled ends of groups of optical fibers. The apparatus comprises a housing in which a light source, a roller and track system, and a color sleeve loop reside, and a cover with an opening through which the bundles of optical fibers are threaded in order to be exposed to the light source. The roller and track system is connected to a means to turn the rollers. If the objective is to provide multiple light patterns to the object, then the color sleeve loop is divided into parallel tracks and each of the bundles of optical fibers is separated from the others by dividers and situated such that light passing through only one track is conveyed to each bundle.

In a preferred embodiment, the apparatus is incorporated into a base for an artificial Christmas tree. The tree has a trunk section and branches with decorations attached to them. Two bundles of optical fibers are threaded into the trunk and fibers from one bundle are distributed through the branches while fibers from the second bundle are distributed to the artificial decorations attached to the branches. The fiber optic bundles are bound by an adaptor or sleeve which is inserted through the opening in the cover of the light apparatus and the bundles are kept separate from one another by a divider. The color sleeve loop has two tracks and the divider is aligned between such tracks on the color sleeve loop to segregate the color of the light provided to the fiber optic bundles.

In operation, the color sleeve loop travels over the rollers and in between the light source and the bundles of optical fibers. Due to the use of the divider, light passing through one track is delivered to only one bundle and light passing through the other track is delivered only to the other bundle. In the preferred embodiment, for example, the fibers dispersed throughout the branches receive light from a track which is of multiple colors while the fibers located in the artificial ornaments receive light from a track which alternates blank and black i.e. blinking patterns.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENT(S)

Figure 1:
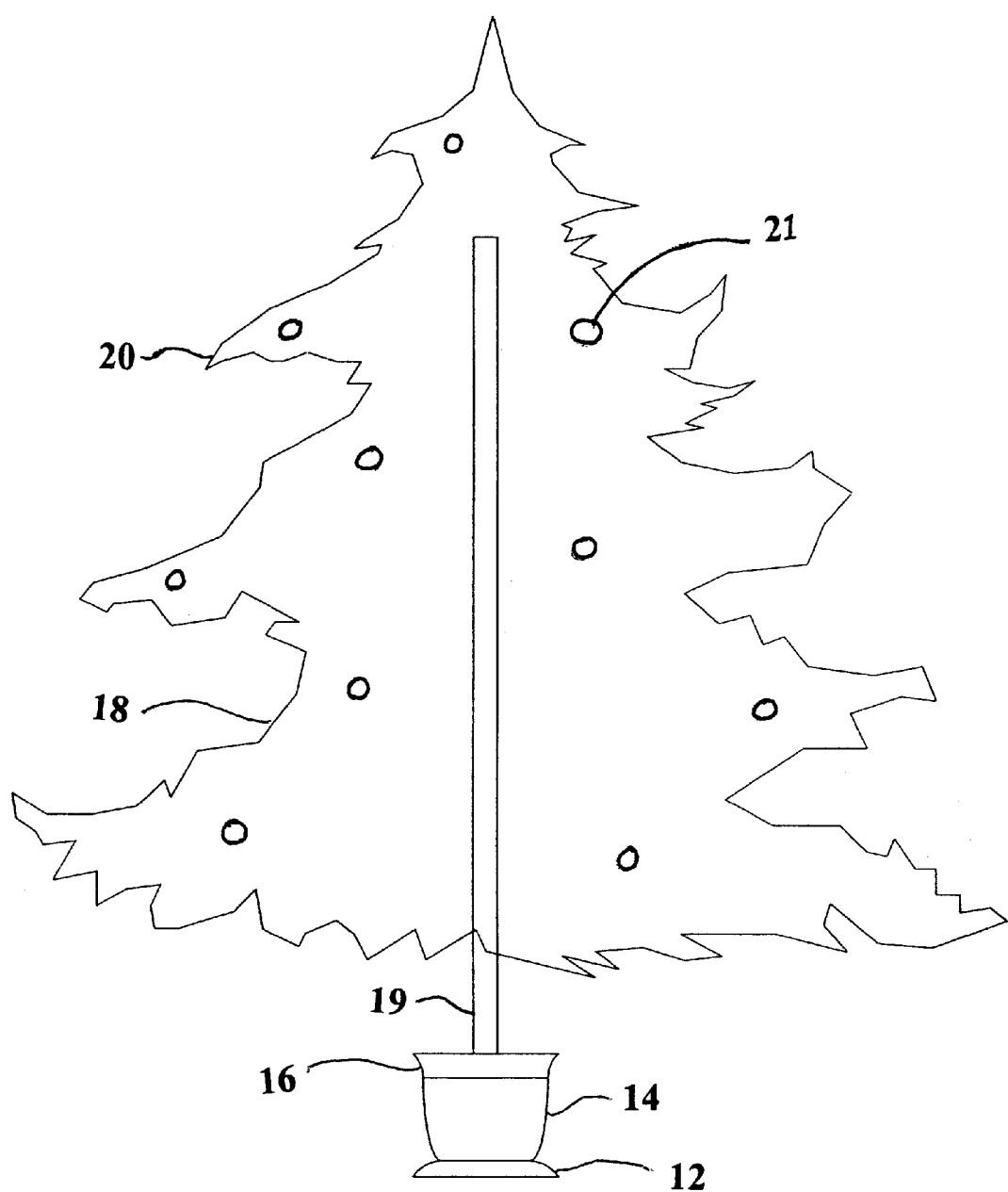
FIG. 1 is a perspective view of an ornamental tree embodying the presnt invention.

Turning now to the drawings and with reference to FIG. 1, a preferred embodiment of a multiple pattern illumination apparatus 10 of the present invention is shown. The apparatus 10 comprises a base plate 12, a housing 14, and a top cover 16, and is incorporated in an artificial Christmas tree cover 18. Comprising the tree 18 is a hollow trunk section 19, a plurality of branch members 20, ornaments 21.

Figure 2:
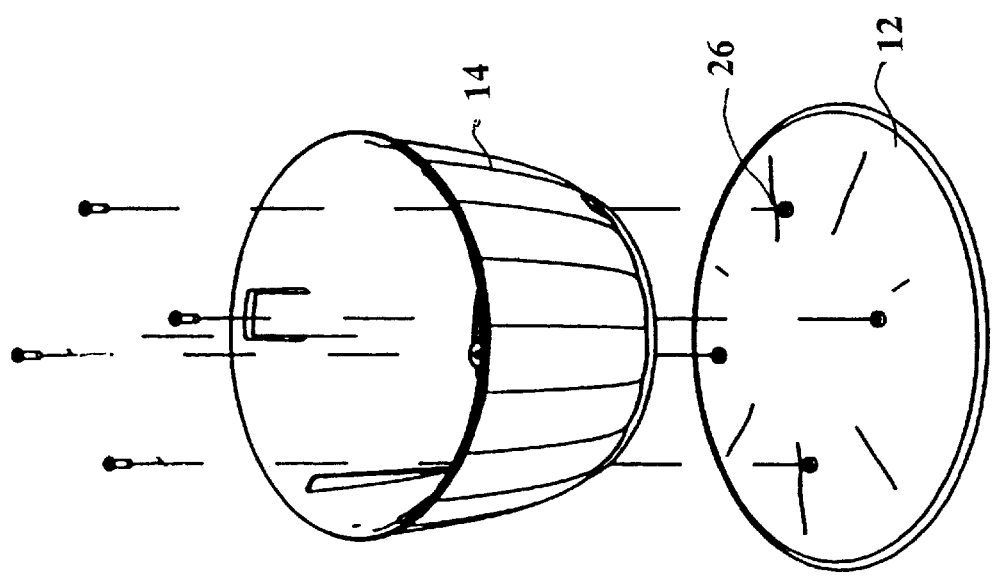
FIG. 2 is a perspective view of the housing and base part of the present invention.

The base plate 12 is preferably of a generally round shape and of a diameter suitable to maintain the balance of the tree 18 to prevent it from falling over. The plate 12 is equipped with receiving means 26 for attachment to the housing 14 as shown in FIG. 2.

Figure 3:
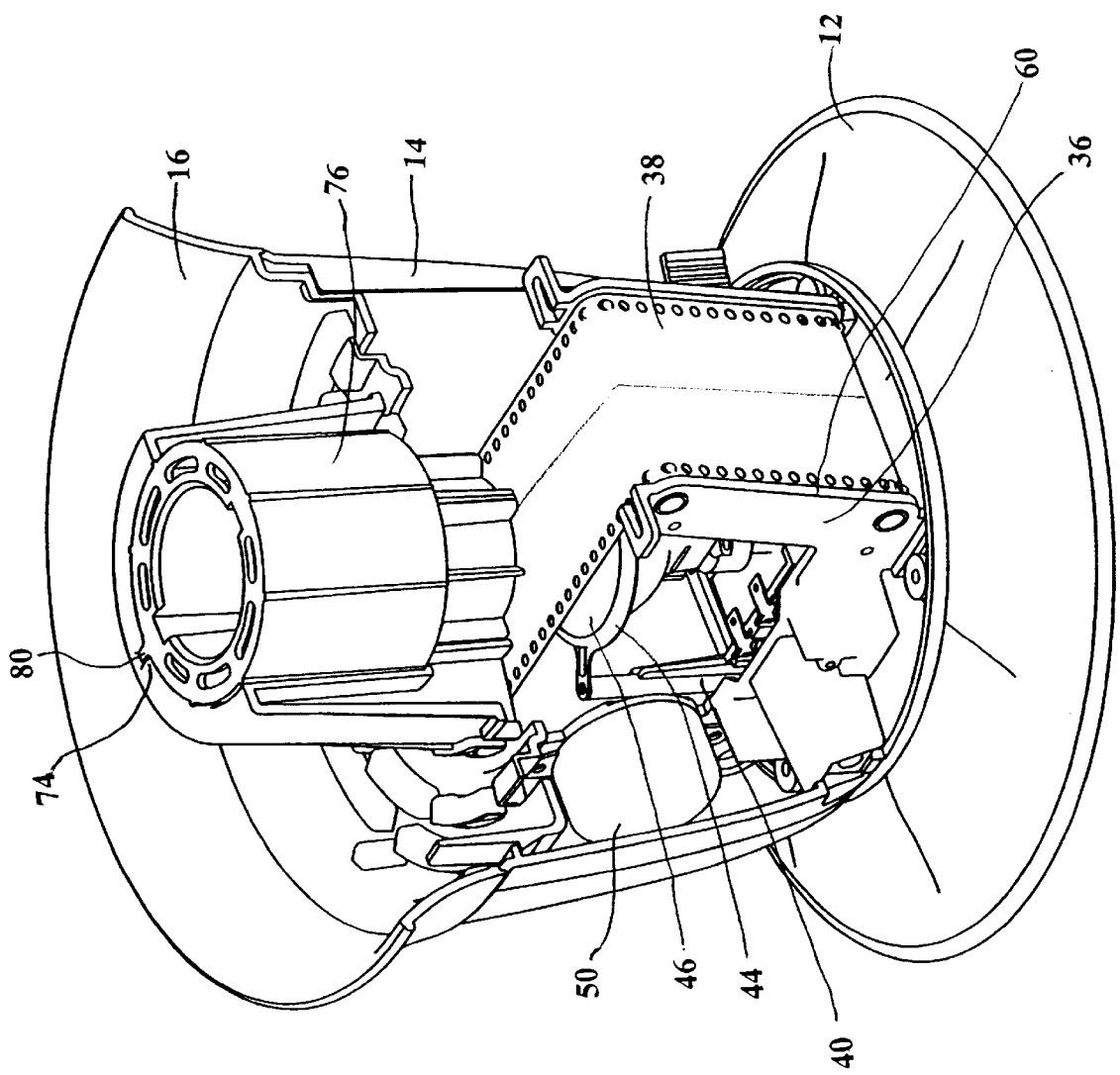
FIG. 3 is a cut-away view of the housing and internal elements of the present invention.
Figure 4:
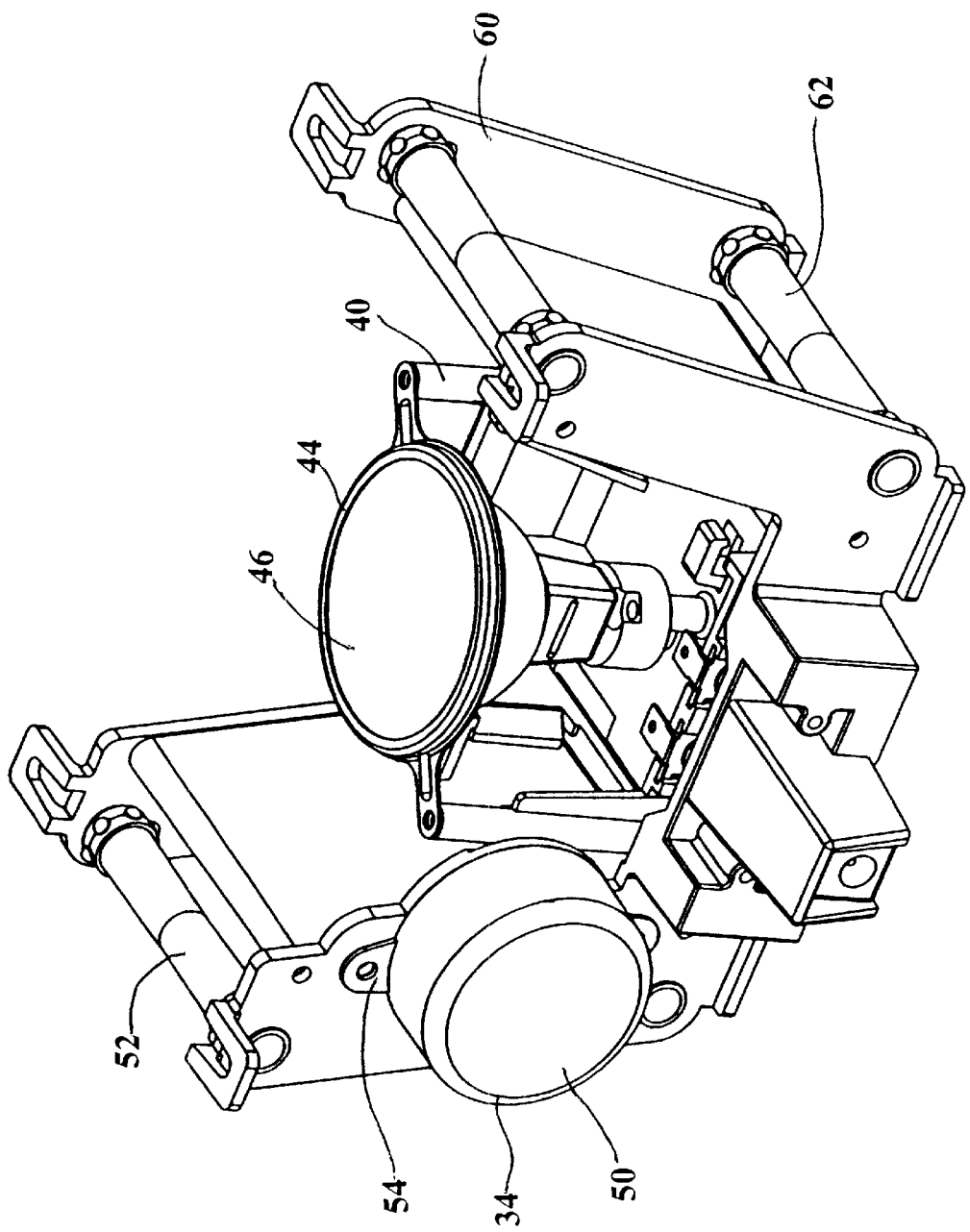
FIG. 4 is a close-up perspective of the light source and roller track system of the prenst invention.
Figure 5:
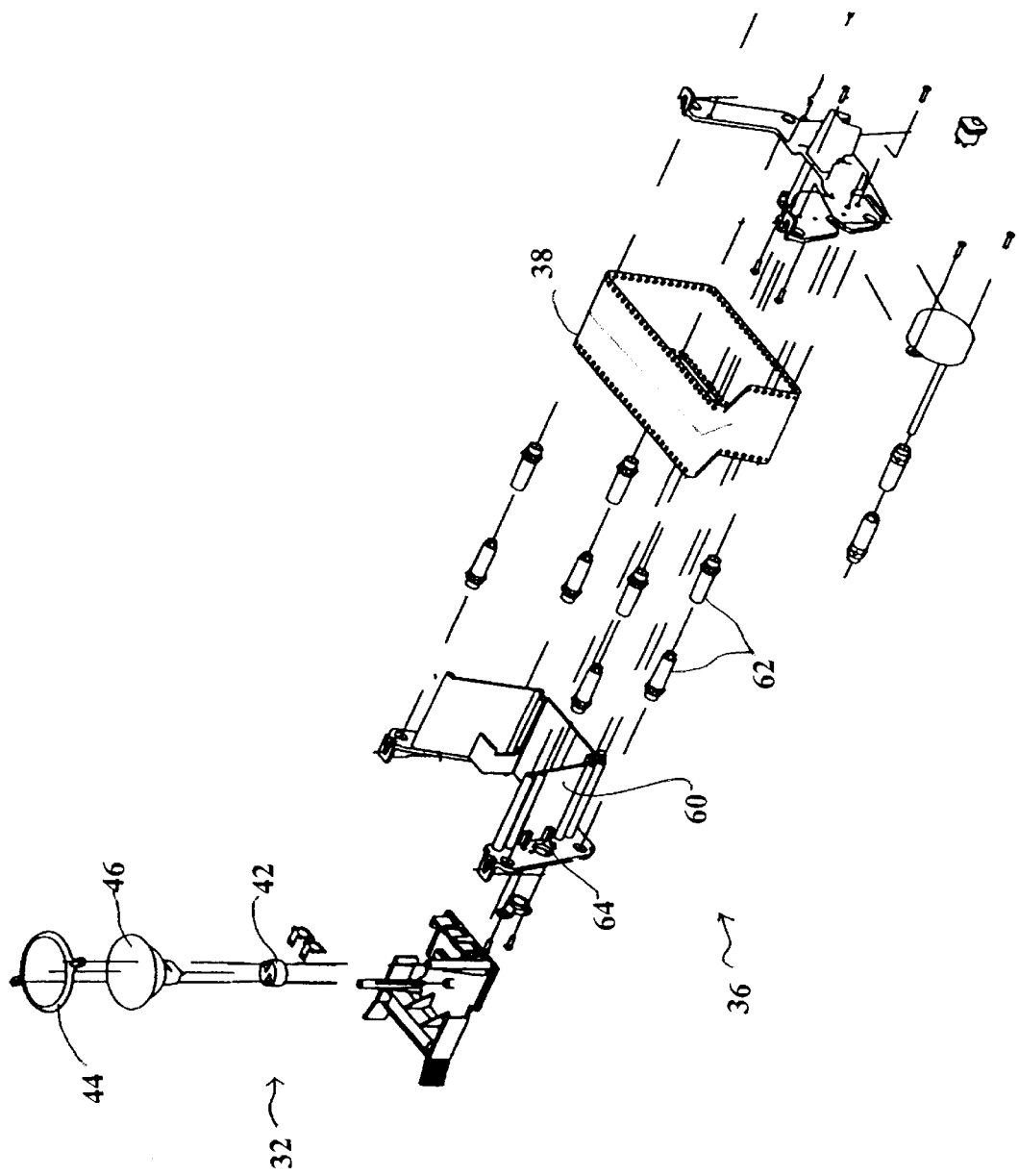
FIG. 5 is an exploded view of the elements of the light source and the roller track system.
Figure 6:
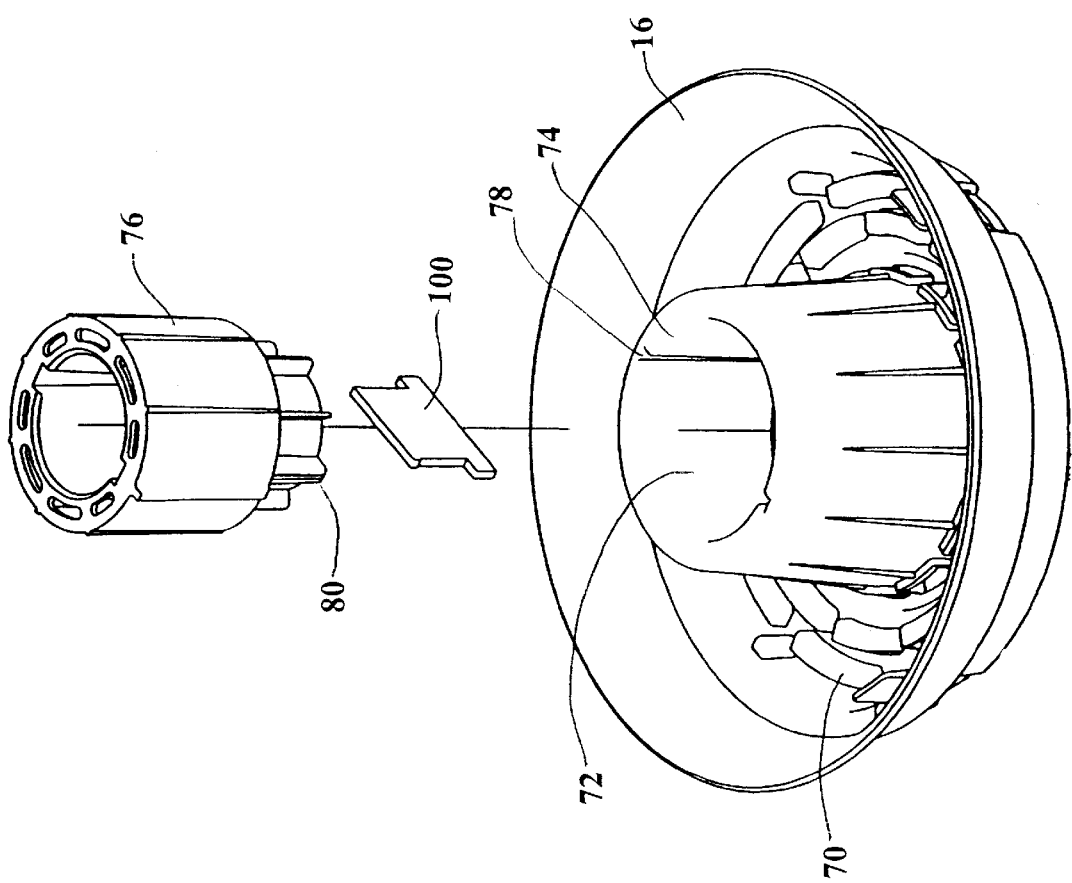
FIG. 6 is an exploded perspective view of the top cover and adaptor of the present invention.
Figure 7:
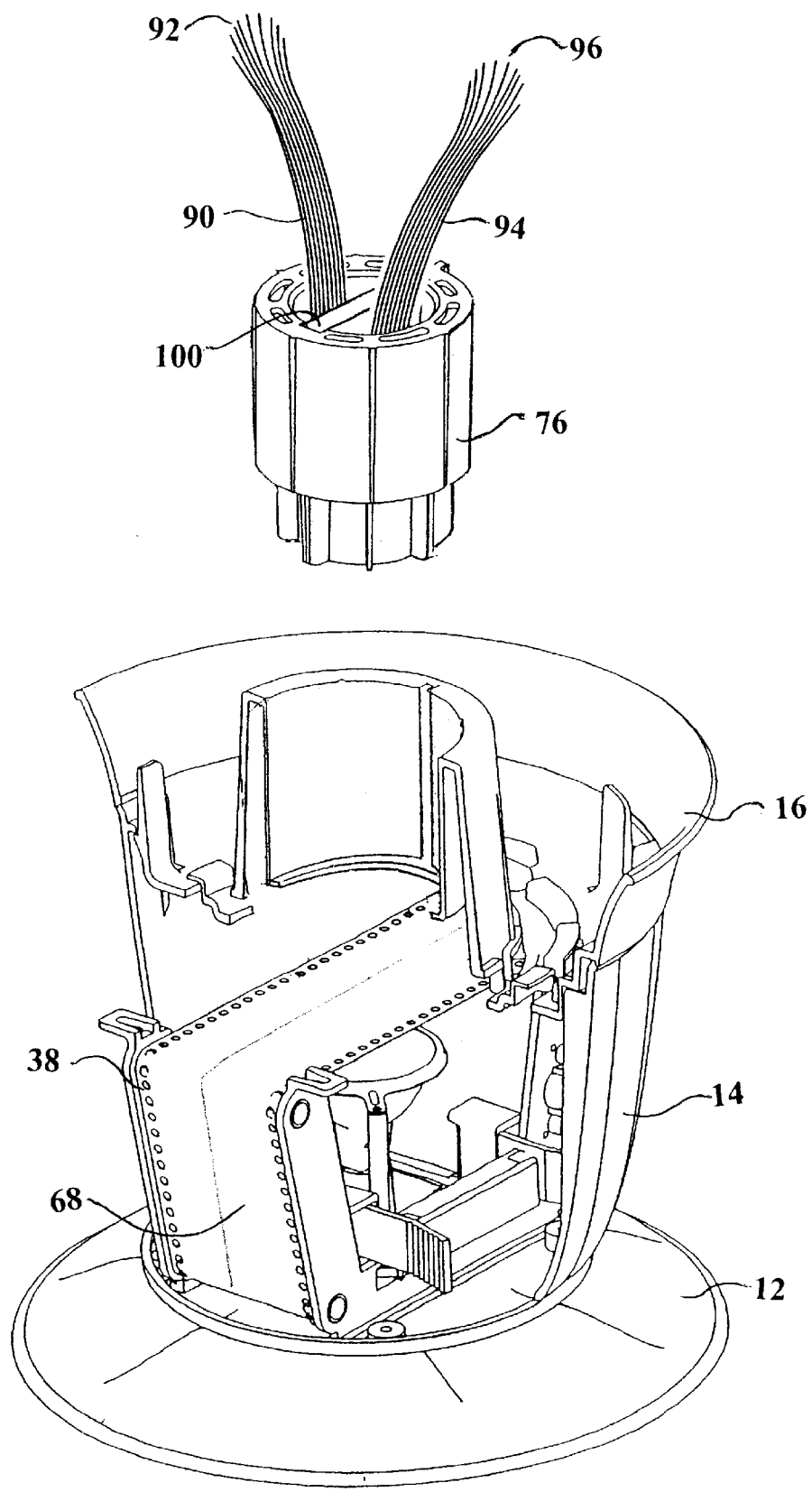
FIG. 7 is a cut-away and exploded view showing the internal elements of the present invention along with the adaptor and optical fibers of the preferred embodiment.

The housing 14 of the preferred embodiment is shaped to resemble other Christmas tree stands and to be attractive as such. Referring now to FIG. 3, the housing 14 includes means 30 that are for the purpose of mounting the housing 14 on the base plate 12. The housing 14 encloses a light source 32, a motor assembly 34, a roller track system 36, and a color sleeve loop 38. The light source 32 comprises a mounting bracket 40 by which the source 34 is attached to the housing 14, a contact plate 42 through which electrical power is provided, a lamp holder 44, and a lamp 46.

In the preferred embodiment, the motor assembly 34 comprises a synchronous motor 50, a primary roller 52 which is driven by the motor 50, a second mounting bracket 54 by which the motor assembly 34 is attached to the housing 14 and means 56 to receive electrical power.

The roller track system 36 comprises a frame 60, rollers 62, and means 64 to associate said rollers 62 in a freely rotational relationship with said frame 60. The color sleeve loop 38 is threaded around the rollers 62. In the preferred embodiment, the color sleeve loop 38 is divided into first and second tracks 67 and 68 respectively along its length. The first track 67 is preferably a series of colored blocks. The second track 68 is preferably a series of black bars spaced at various intervals.

The top cover 16 in the preferred embodiment fits within the housing 14 for aesthetic purposes and is made of molded plastic. The cover 16 comprises multiple vents 70 and a central opening 72 which includes means 74 to secure an adapter 76 in place. The means 74 is formed of vertically oriented flange slots 78 in the preferred embodiment.

The adaptor 76 is of a shape complimentary to the central opening 72 in the top cover 16. It is further comprised of flanges 78, 80 which fit into the means 74 to secure the adapter 76 to the top cover 16.

In the preferred embodiment, a first set of optical fibers 90 bundled at one end has a plurality of free ends 92 and a second set of optical fibers 94 bundled at one end has a plurality of free ends 96. The first set and second set of fibers, 90 and 94, respectively, are threaded through the hollow trunk section 19 and then through the adaptor 76. The first and second sets, 90 and 94, are separated within the adaptor 76 by a divider I 00.

In operation, the flanges 78, 80 of the adaptor 76 are threaded through the central opening 72 of the top cover 16 and the flange slots 74. The divider 100 is aligned with the flanges 78, 80 which, in turn, ensures proper alignment of the first set 90 with the first track 67 and alignment of the second set 94 with the second track 68.

Upon application of electric power, the motor 50 turns the primary roller 52 which, in turn, moves the color sleeve loop 38 and turns the other rollers 62. When the lamp 46 is turned on, it provides light rays that shine through both of the tracks 67 and 68 of the color sleeve loop 66. Light through track 67 shines into the first set of optical fibers 90. The free ends 92 of the first fiber set 90 are located in the branch members 20 and change colors as the first track 67 is moved past the lamp 46. Light through track 68 shines into the second set of optical fibers 94. The free ends 96 of the second fiber set 94, which are located in the ornaments 21, cause the ornaments to appear to blink on and off as the track 68 is moved past the lamp 46.

Thus, the present invention has been described in an illustrative manner. It is to be understood that the terminology that has been used is intended to be in the nature of words of description rather than of limitation.

Many modifications and variations of the present invention are possible in light of the above teachings. For example, more than two tracks, and therefore, more than two bundles of fibers could be employed. In addition, the use of this apparatus is not to be interpreted as restricted in any way to holiday decorations. There are many other ways in which the apparatus could be employed. Therefore, within the scope of the appended claims, the present invention may be practiced otherwise than as specifically described.

What I claim is:

1. An apparatus to provide illumination comprising;
    (a) a first plurality of optical fibres each with a proximal and a distal end wherein the proximal ends are bundled together;
    (b) a second plurality of optical fibres each with a proximal and a distal end wherein the proximal ends are bundled together;
    (b) a housing containing a single light source and a roller track system having at least two rollers;
    (c) means to rotatably drive at least one of said rollers;
    (d) a color sleeve loop aligned on said roller track system so that as a first roller driven by the drive means rotates said color sleeve loop is caused to travel along the roller track system in a continuous motion; and
    (e) said color sleeve loop is positioned to rotate past and in between said light source and said proximal ends of said first plurality of fibres and said proximal ends of said second plurality of fibres;
    (f) said color sleeve loop comprises a first section and a second section alone its length;
    (g) said first section includes a first pattern of color;
    (h) said second section includes a second pattern of color;
    (i) said bundled ends of said first and second pluralities of optical fibres are proximate one another and separated by a divider; and
    (j) said bundled ends of said first and second pluralities of optical fibres are positioned over said first and second sections of said color sleeve loop, respectively, with said divider aligned between said first and second sections of said color sleeve loop.

2. An apparatus to provide illumination as claimed in claim 1 further comprising:
    (a) said means to rotate said driven roller is a synchronous motor associated in a driving relationship with the roller driven by the driving means; and
    (b) said distal ends of said first plurality of fibres are arranged to deliver light as desired, and which differs from light delivered from said distal ends of said second plurality of fibres.

3. An apparatus to provide illumination comprising:
    (a) a base plate;
    (b) a housing containing a light source, a frame upon which are mounted at least two rollers, and a color sleeve loop with at least two circumferential sections positioned on said rollers wherein said circumferential sections each contain a color pattern;
    (c) means to turn at least one of said rollers;
    (d) means to attach said base plate to said housing;
    (e) at least one divider; and
    (f) at least two groups of optical fibres, each fibre comprising a proximal and a distal end wherein each proximal end of each fibre in each group is bundled to the others in the group and said proximal ends of said groups are segregated from one another by said divider.

4. An apparatus to provide illumination as claimed in claims 1 further comprising:
    (a) a top cover comprising a central opening, flange slots positioned in said central opening, air vents, and means to associate said top cover with said housing;

(b) an adapter comprising a hollow interior, an exterior, and flanges mounted on said exterior wherein said adaptor is shaped complementarily to said central opening in said cover and said flanges correspond with said flange slots; and (c) said bundled ends of said at least two groups of optical fibres are positioned in said hollow interior of said adaptor and separated by said dividers.

5. An apparatus to provide illumination as claimed in claim 4 wherein said means to drive said one roller is a synchronous motor.

6. An apparatus to provide illumination as claimed in claim 5 further comprising:

(a) said color sleeve loop positioned on said rollers is moved around said frame upon actuation of said motor and rotation of said one driven roller;

(b) said color sleeve loop passes in-between said light source and said bundled ends of said at least two groups of optical fibres and each of said at least one divider is aligned between two of said at least two circumferential sections on said color sleeve loop.

7. An apparatus to provide illumination as claimed in claim 6 further comprising:

(a) a hollow trunk section in which said adaptor fits; and (b) a plurality of branch members comprising means for attaching to said hollow trunk section and around and through which said distal ends of said at least two groups of optical fibres can be arranged.

8. An apparatus to provide illumination as claimed in claim 7, wherein one circumferential section contains a first color pattern containing multiple colors and a second circumferential section contains a second color pattern containing black bars and clear bars such that upon activation of said motor and said light source, said distal ends of one said group of fibres continuously changes color and said distal ends of another of said groups of fibres blinks.

9. An apparatus to provide illumination as claimed in claim 8, wherein a plurality of ornaments are attached to said branches and said distal ends of one said group of optical fibres are located in said ornaments such that upon activation of said motor and said light source, said ornaments blink on and off.

10. An apparatus to provide lighting comprising:

(a) a base plate;

(b) a housing containing a light source and a frame upon which are mounted at least two rollers and means to attach said housing to said base plate;

(c) a color sleeve loop with at least two circumferential sections wherein each section contains a color pattern and said color sleeve loop is fitted around the frame on said rollers;

(d) a synchronous motor associated with at least one of said rollers wherein upon activation, said motor rotatably drives said roller and moves said color sleeve loop around said frame and past said light source;

(e) at least two groups of optical fibres, each fibre comprising a proximal and a distal end, wherein each proximal end of each fibre in each group is bundled to the others in the group;

(f) a top cover comprising a central opening, flange slots positioned in said central opening, air vents, and means to associate said top cover with said housing;

(g) an adapter comprising a hollow interior, an exterior, and flanges mounted on said exterior wherein said adaptor is shaped complementarily to said central opening in said cover and said flanges correspond with said flange slots;

(h) said bundled ends of said at least two groups of optical fibres are positioned in said hollow interior of said adaptor and are separated by at least one divider which is, in turn, aligned relative to said flanges and between two of said at least two circumferential sections on said color sleeve loop which is positioned in-between said light source and said bundled ends of said groups of optical fibres such that light through only one circumferential section is transmitted to the bundled ends of each of said groups of optical fibres;

(i) a hollow trunk section in which said adaptor fits;

(j) a plurality of branch members with means for attaching to said hollow trunk section and around and through which said distal ends of at least one of said groups of optical fibres are arranged; and (k) a plurality of ornaments associated with said branch members and with which said distal ends of at least one of said groups of optical fibres are associated.

* * * * *